United States Patent
Kappich et al.

(10) Patent No.: US 8,567,771 B2
(45) Date of Patent: Oct. 29, 2013

(54) DEVICE FOR MOUNTING A DRIVE UNIT IN A MOTOR VEHICLE

(75) Inventors: Joachim Kappich, Bad Liebenzell (DE); Horst Grossmann, Neuhausen (DE)

(73) Assignee: Dr. Ing. H.C. F. Porsche Aktiengesellschaft, Stuttgart (DE)

(*) Notice: Subject to any disclaimer, the term of this patent is extended or adjusted under 35 U.S.C. 154(b) by 513 days.

(21) Appl. No.: 12/470,515

(22) Filed: May 22, 2009

(65) Prior Publication Data

US 2010/0044938 A1 Feb. 25, 2010

(30) Foreign Application Priority Data

Aug. 23, 2008 (DE) .................. 10 2008 039 479

(51) Int. Cl.
*F16F 5/00* (2006.01)
(52) U.S. Cl.
USPC ..................... 267/140.11; 267/141
(58) Field of Classification Search
USPC ........... 267/140.11, 140.3, 140.4, 140.5, 141; 180/291, 299; 123/192.1; 248/560, 248/609, 639
See application file for complete search history.

(56) References Cited

U.S. PATENT DOCUMENTS

| | | | |
|---|---|---|---|
| 2,020,597 A | 11/1935 | Appel | |
| 3,402,782 A | 9/1968 | Ljungström | |
| 3,825,090 A | 7/1974 | Runkle et al. | |
| 4,240,517 A | 12/1980 | Harlow, Jr. et al. | |
| 4,377,218 A | 3/1983 | Fukushima | |
| 4,564,082 A * | 1/1986 | Takehara et al. | 180/312 |
| 4,901,814 A | 2/1990 | Von Broock et al. | |
| 5,035,296 A * | 7/1991 | Sjostrand | 180/297 |
| 5,133,427 A * | 7/1992 | Arvidsson et al. | 180/297 |
| 5,472,063 A * | 12/1995 | Watanabe et al. | 180/274 |
| 6,390,223 B1 | 5/2002 | Savage et al. | |
| 6,629,576 B2 | 10/2003 | Kramer et al. | |
| 6,708,793 B2 * | 3/2004 | Witherspoon et al. | 180/291 |
| 2002/0166711 A1 * | 11/2002 | Witherspoon et al. | 180/291 |

FOREIGN PATENT DOCUMENTS

| | | |
|---|---|---|
| DE | 1580712 A1 | 7/1970 |
| DE | 2434633 A1 | 2/1975 |
| DE | 3047791 A1 | 10/1981 |
| DE | 3621317 A1 | 1/1987 |

(Continued)

OTHER PUBLICATIONS

Machine translation of DE 36 21 317.*

(Continued)

*Primary Examiner* — Bradley King
*Assistant Examiner* — Nicholas J Lane
(74) *Attorney, Agent, or Firm* — Leydig, Voit & Mayer, Ltd.

(57) ABSTRACT

A drive unit in a motor vehicle is mounted with two elastic motor mounts, of which each in each case couples an engine support, connected rigidly to the drive unit, elastically to a body structure of the motor vehicle, and with a torque support which is arranged above the two motor mounts transversely with respect to the vehicle longitudinal axis and which is coupled at one end to the drive unit and is coupled at another end to the body structure and is configured such that the two ends are connected, damped elastically, to one another. There is also provided a damping support arranged at a lower level than the torque support transversely with respect to the vehicle longitudinal axis and which is coupled at one end to the drive unit and is coupled at another end to the body structure. The damping support is configured such that transverse vibrations of the drive unit are damped.

5 Claims, 1 Drawing Sheet

(56) References Cited

FOREIGN PATENT DOCUMENTS

| | | |
|---|---|---|
| DE | 3721507 A1 | 1/1989 |
| DE | 3808762 A1 | 9/1989 |
| DE | 100 24 164 B4 | 7/2004 |
| EP | 0566178 A1 | 10/1993 |
| GB | 2126546 A | 3/1984 |
| JP | 58063519 A | 4/1983 |
| JP | 58063520 A * | 4/1983 |
| JP | 59011919 A * | 1/1984 |
| JP | 05024440 A * | 2/1993 |

OTHER PUBLICATIONS

Machine Translation of JP 05-024440.*
German Search Report dated Aug. 12, 2009.

* cited by examiner

DEVICE FOR MOUNTING A DRIVE UNIT IN A MOTOR VEHICLE

CROSS-REFERENCE TO RELATED APPLICATION

This application claims the priority, under 35 U.S.C. §119, of German patent application DE 10 2008 039 479.3, filed Aug. 23, 2008; the prior application is herewith incorporated by reference in its entirety.

BACKGROUND OF THE INVENTION

Field of the Invention

The present invention lies in the automotive field. More specifically, the invention relates to a device for mounting a drive unit in a motor vehicle, with two elastic motor mounts, also referred to as engine mounts, of which each in each case couples an engine support, connected rigidly to the drive unit, elastically to a body structure of the motor vehicle, and with a torque support which is arranged above the two motor mounts transversely with respect to the vehicle longitudinal axis and which is coupled at one end to the drive unit and is coupled at another end to the body structure and is configured such that the two ends are connected, damped elastically, to one another.

Such a device is known per se. An elastic torque support arranged transversely with respect to the vehicle longitudinal axis is described in the commonly assigned U.S. Pat. No. 6,629,576 B2 and German patent DE 100 24 164 B4.

A drive unit is understood here to mean any rigid composite structure of an engine with further drive train components. The engine is nowadays, as a rule, an internal combustion engine which is screwed together with one or more transmissions (gear-change transmission and/or power divider and/or differential).

In general, mountings of such drive units are, on the one hand, intended for decoupling the vehicle body from vibrations of the drive unit. On the other hand, the mounting has to limit relative movements of the drive unit with respect to the vehicle body.

The vibrations are excited, for example, due to the periodic type of operation of an internal combustion engine of the drive unit and they have an adverse influence on noise comfort, particularly during idling. As a rule, noise comfort rises with decreasing rigidity, that is to say with a decrease in spring constant of the elastic motor mounts.

The relative movements are caused, for example, by the torque support of the engine in the motor mounts. Another cause of relative movements arises due to the inert mass of the drive unit which may amount to one quarter of the overall mass of the motor vehicle. If, in driving, this mass is excited into vibrations with respect to the vehicle body in the event of rapid swerving, on alternating bends and/or due to road unevenesses, this may have an adverse influence on steering accuracy and therefore on the driving dynamics. The amplitude of the relative movements rises with a decreasing spring constant of the motor mounts. In the mounting of a drive unit in a vehicle body, therefore, a conflict of objects arises in that the mounting should be as soft as possible for good acoustics, whereas exact drivability is assisted by a more rigid mounting.

Known mountings of drive units installed in the vehicle longitudinal direction have three stable motor mounts of which in each case one connects the engine laterally to the body and one connects the transmission to the body.

In the known device, the lateral motor mounts are arranged approximately level with the center of gravity of the drive unit. For production reasons, moreover, they are arranged essentially vertically in the vehicle. The main load therefore acts essentially vertically on the motor mounts.

Prior art lateral motor mounts have a compact rubber buffer which, although absorbing forces from all three directions of space, nevertheless possesses different spring constants as a function of the direction. Damping actions of the lateral motor mounts also arise preferentially in the direction of the vertically acting main load.

The transversely arranged torque support additionally present serves, on the one hand, for allowing idling movements of the drive unit in the transverse direction and, on the other hand, for ensuring a sufficient torque support during operation. This is ensured by arranging the torque support at a comparatively high level on a valve hood of an internal combustion engine with a V-shaped arrangement of the cylinders, in conjunction with a highly progressive configuration of the elasticity of the torque support.

It has been shown that, in test vehicles equipped with such a torque support, disturbing trembling movements of the vehicle body have occurred under unfavorable circumstances during driving. Such trembling movements have been observed, for example, during trips on specific road sections.

SUMMARY OF THE INVENTION

It is accordingly an object of the invention to provide a device for supporting a drive unit for a motor vehicle which overcomes the above-mentioned disadvantages of the heretofore-known devices and methods of this general type and which is configured to reduce disturbing trembling movements even under unfavorable circumstances.

With the foregoing and other objects in view there is provided, in accordance with the invention, a device for mounting a drive unit in a motor vehicle, comprising:

two elastic motor mounts, each coupling a respective engine support, connected rigidly to the drive unit, elastically to a body structure of the motor vehicle;

a torque support disposed above the two motor mounts and transversely with respect to a vehicle longitudinal axis, the torque support having a first end coupled to the drive unit and a second end coupled to the body structure, and the first and second ends are connected to one another with elastic damping; and a damping support disposed at a lower level than the torque support transversely with respect to the vehicle longitudinal axis, the damping support having a first end coupled to the drive unit and a second end coupled to the body structure, and being configured to damp transverse vibrations of the drive unit.

In other words, owing to the damping support, which is arranged below the torque support transversely with respect to the vehicle longitudinal axis and which is coupled at one end to the engine and is coupled at another end to the vehicle body and which is configured such that it damps transverse vibrations of the drive unit, the disturbing trembling movements are effectively prevented or at least reduced.

In accordance with an added feature of the invention, the motor mounts are disposed below a center of gravity of the drive unit. Preferably, also, the motor mounts are disposed below the drive shafts that connect the driving wheels of the motor vehicle to the drive unit.

In accordance with an additional feature of the invention, the damping support is disposed nearer to the motor mounts in a vertical z-direction than to the torque support.

In accordance with a further feature of the invention, the first and second ends of the damping support are coupled elastically to one another. Preferably, the damping support is configured with a spring constant that is lower than a spring constant of the torque support. In a specific embodiment, the spring constant of the damping support amounts to between 40% and 60% of the spring constant of the torque support.

In accordance with again an added feature of the invention, the damping support is configured with a damping constant that is higher than a damping constant of the torque support.

In a preferred embodiment of the invention, one end of the damping support is a rigid bearing element and an opposite end of the damping support is an elastically damped bearing element.

In accordance with a concomitant feature of the invention, the damping support includes means for hydraulic damping, such as an hydraulically damped bushing.

As described, a preferred refinement is distinguished in that the motor mounts are arranged not only at a lower level than the torque support, but also at a lower level than the center of gravity of the drive unit. As a result, the lateral motor mounts are, in particular, arranged at a lower level than in the case of a vibrationally optimal arrangement level with the center of gravity of the drive unit. The advantage of the lower arrangement is that additional construction space is gained in the side regions of the drive unit. This construction space can be utilized for accommodating further subassemblies. What may be considered here are, for example, an exhaust gas turbocharger and/or a differential gear which with the engine forms part of the drive unit.

As a result, due to the lower arrangement of the lateral motor mounts, degrees of freedom in construction space utilization are obtained which make it possible to reduce the body height required for accommodating the drive unit. This affords further degrees of freedom in the design of the vehicle body, which can be utilized, for example, for a reduction in air resistance.

Other features which are considered as characteristic for the invention are set forth in the appended claims.

Although the invention is illustrated and described herein as embodied in a device for mounting a drive unit in a motor vehicle, it is nevertheless not intended to be limited to the details shown, since various modifications and structural changes may be made therein without departing from the spirit of the invention and within the scope and range of equivalents of the claims. It will also be appreciated that the features mentioned above and in the following text can be used not only in the combinations specified in each case, but also in other combinations or alone, without departing from the scope of the present invention.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
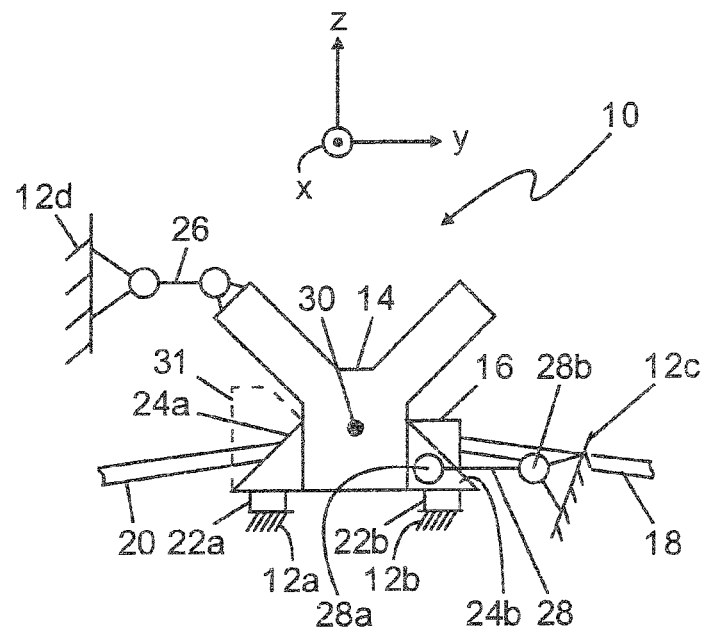
FIG. 1 is a diagrammatic overall view of a device according to the invention for mounting a drive unit in a motor vehicle.

Referring now to the figures of the drawing in detail and first, particularly, to FIG. 1 thereof, there is shown, in highly diagrammatic form, a drive unit 10 which is mounted in a body structure of a motor vehicle. The body structure may be, for example, body subassemblies, such as auxiliary frames 12a, 12b, 12c and/or longitudinal beams 12d. FIG. 1 illustrates a front view in which the viewing direction is antiparallel with respect to a direction of travel x of the motor vehicle. A transverse direction of the motor vehicle is designated by y and a vertical direction is designated by z.

The drive unit 10 has an engine 14 which is connected rigidly to further drive train components, such as a gear-change transmission. In FIG. 1, the gear-change transmission lies behind the engine 14 in the viewing direction and is therefore concealed by the engine 14. Depending on the drive concept, further transmissions, such as power dividers and/or differential gears, may be connected rigidly to the engine 14. In hybrid drives, a plurality of engines, for example an internal combustion engine and an electric motor, may be connected rigidly to one another. The mass of such a drive unit may amount to one quarter of the overall mass of the motor vehicle.

FIG. 1 depicts an embodiment in which a differential gear 16, arranged on the right in the viewing direction, is connected rigidly to the engine 14. Drive shafts 18, 20 emanating from the differential gear 16 transfer torques between outputs of the differential gear and driving wheels, not illustrated, of the motor vehicle. An input of the differential gear is connected to the gear-change transmission via a further shaft. On an all-wheel vehicle, torque transfer is effected between the gear-change transmission and differential via a power divider which distributes an output torque of the gear-change transmission to various drive axles. It will be appreciated, however, that the invention is not restricted to such a drive unit and can also be used in conjunction with other drive units. One or more of said transmissions may, for example, be mounted separately in the body structure of the motor vehicle.

The device, illustrated in FIG. 1, for mounting the drive unit 10 has two elastic motor mounts 22a, 22b, of which each in each case couples an engine support 24a, 24b, connected rigidly to the drive unit 10, elastically to an auxiliary frame 12a, 12b of the body structure of the motor vehicle. In one embodiment, the lateral motor mounts 22a, 22b have a compact rubber buffer which absorbs forces from all three directions of space, but possesses different spring constants as a function of the direction. Furthermore, embodiments of the motor mounts 22a, 22b have cavities which are filled with a damping fluid, such as Glysantin, and are connected hydraulically to another. The cavities are delimited elastically by the rubber buffer. Dimensional changes of the rubber buffer lead to a change in volume of the cavities which causes a flow of damping fluid between the cavities. The flow resistance occurring in this case in the hydraulic connection of the cavities damps the excited vibration. Conventional motor mounts are constructed such that the damping action is not isotropic, but occurs preferentially in the direction of the vertically acting main load.

Furthermore, the device for mounting the drive unit 10 has a torque support 26 which is arranged above the two motor mounts 22a, 22b transversely with respect to the vehicle longitudinal axis and which is coupled at one end to the drive unit 10 and is connected at another end to the longitudinal beam 12d as part of the body structure. The torque support 26 is configured such that the two ends are connected, damped elastically, to one another. The torque support 26 corresponds in one embodiment to the type of torque support known from the above-mentioned German patent DE 100 24 164 B4 and U.S. Pat. No. 6,629,576 B2.

Moreover, the device for mounting the drive unit 10 has a damping support 28 which is arranged below the torque support 26 transversely with respect to the vehicle longitudinal axis and which is coupled at one end 28a to the engine 14 and is coupled at another end 28b to the vehicle body. In the embodiment illustrated, the other end 28b of the damping support 28 is coupled to a beam 12c. Alternatively, the damping support 28 may also be coupled to the auxiliary frame 12b.

The invention is based on the recognition that arranging the progressively rigid torque support 26 at a high level, as known, in conjunction with arranging lateral motor mounts 22a, 22b at a comparatively lower level, leads to a vertical displacement of a center of rotation of the drive unit 10: transversely acting forces, as a rule, generate on the drive unit 10 tilting torques which the drive unit 10 follows by means of rotary deflection.

Without the upper torque support 26 and without the damping support 28, the drive unit 10 would be deflected over a small angle of rotation in the lateral motor mounts 22a, 22b. The lateral motor mounts 22a, 22b would in that case be deformed essentially vertically and only slightly in the horizontal direction. The highest transverse amplitude would occur at the upper end of the drive unit 10.

The comparatively rigid torque support 26 reduces the transverse amplitude at the upper end of the drive unit 10 and forces the drive unit 10 to avoid transverse forces acting on it by means of a greater horizontal deformation of the lateral motor mounts 22a, 22b. As stated above, the damping action of conventional motor mounts is concentrated onto the vertical direction. A horizontal deflection of the lateral motor mounts 22a, 22b which is caused by transverse forces can therefore excite a transverse vibration which is damped only slightly by the lateral motor mounts 22a, 22b and which is perceived by the driver as a disturbing trembling movement.

Since the device according to the invention has the damping support 28
- which is arranged at a lower level in the z-direction than the torque support 26 and transversely with respect to the vehicle longitudinal axis; and
- which is coupled at one end to the engine and is coupled at another end to the vehicle body; and
- which is configured such that it damps transverse vibrations of the drive unit, such disturbing trembling movements are effectively prevented or at least reduced.

In one embodiment, the motor mounts 22a, 22b are not only arranged at a lower level than the upper torque support, but also below the center of gravity 30 of the drive unit 10. In the subject matter of FIG. 1, the motor mounts 22a, 22b are arranged, in particular, at a lower level than the drive shafts 18, 20 in the z-direction.

In the case of a vibrationally optimal arrangement of the lateral motor mounts 22a, 22b in the region of the center of gravity 30 of the drive unit 10, tilting movements of the drive unit 10 which take place about the vehicle longitudinal axis would lead to forces in the lateral motor mounts 22a, 22b which are directed essentially vertically, that is to say in the z-direction, and possess only low force components in the vehicle transverse direction y. The acting forces would then lie essentially parallel to the preferential direction of damping which lies parallel to the vertical installation position preferred for production reasons. This will lead to a desirably rapid attenuation of the vibrations.

This desired property is restricted by the motor mounts 22a, 22b being arranged at a lower level, since, in the case of tilting movements of the drive unit 10, the arrangement at a lower level leads to higher transverse forces in the lateral motor mounts 22a, 22b and consequently to a higher excitation of transverse vibrations of the drive unit 10. These transverse vibrations take place more or less at right angles to the main damping direction of the lateral motor mounts 22a, 22b. The lateral motor mounts 22a, 22b therefore sometimes do not damp this vibration sufficiently, and therefore the transverse vibrations of the drive unit 10 which are transferred to the body are perceptible as disturbing trembling movements.

Since these trembling movements are damped by virtue of the present invention, the embodiment having the downwardly offset motor mounts 22a, 22b leads to the abovementioned degrees of freedom of design, without the advantages associated with this being impaired by adversely disturbing trembling movements. FIG. 1 shows by dashes a construction space 31 which, by the lateral motor mounts 22a, 22b being arranged at a comparatively low level, can be utilized for other purposes on the left side of the drive unit 10 in the viewing direction. This construction space may be utilized, for example, for arranging a turbocharger. In the embodiment illustrated, the construction space which can additionally be utilized on the opposite right side is used for arranging the differential gear 16. Such a differential gear would have to be arranged in the z-direction if the lateral motor mounts 22a, 22b were arranged at a higher level. As a result, a greater overall height would have to be taken into account, and this would undesirably restrict the degrees of freedom of design.

A further advantage of the separate damping support 28, as compared with a likewise conceivably inclined arrangement of the lateral motor mounts 22a, 22b, is also seen in that the vertical arrangement of the lateral motor mounts 22a, 22b which is desired for production reasons is maintained.

Furthermore, by means of the separate damping support 28 lying substantially transversely with respect to the main damping direction of the lateral motor mounts 22a, 22b, the transverse damping can be predetermined in structural terms independently of the damping of the lateral motor mounts. An arrangement of the damping support 28 in the z-direction, which lies nearer to the motor mounts 22a, 22b than to the torque support 26, has the advantage that the engine support 24b, to which the elastic motor mount 12b is coupled, can also be used for coupling the damping support 28 so as to save components and construction space.

Moreover, arranging the damping support at a level similar to the arrangement of the lateral motor mounts in the z-direction allows an effective damping of horizontal trembling movements which occur in the lateral motor mounts.

Figure 2:
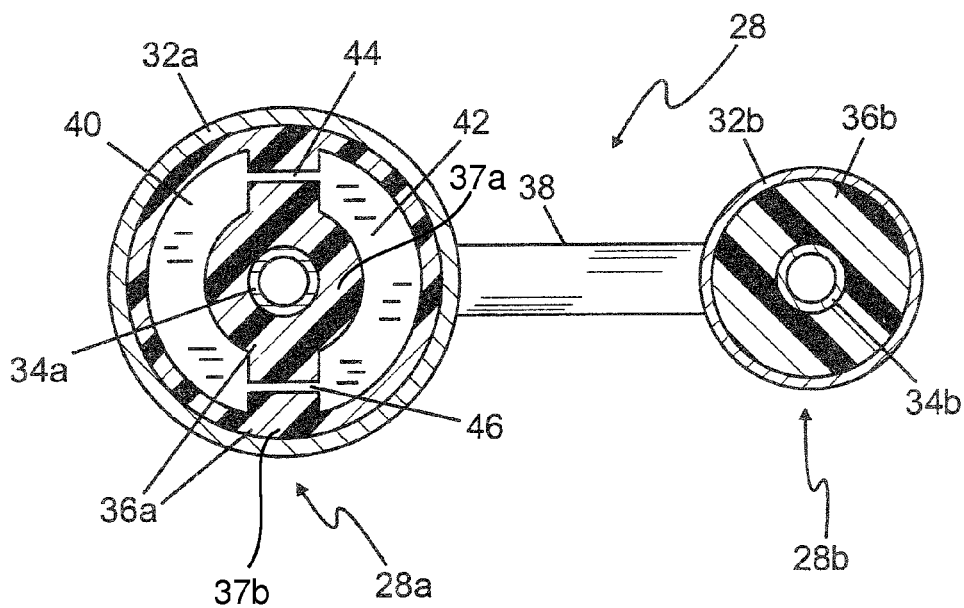
FIG. 2 is a sectional view of an exemplary embodiment of a damping support.

FIG. 2 shows an embodiment of a damping support 28 with a first end 28a and with a second end 28b in a sectional illustration. Each end 28a, 28b has an outer sleeve 32a, 32b and an inner sleeve 34a, 34b arranged in each case within the outer sleeve. The outside of one of the inner sleeves 34a, 34b in each case is connected to the inside of the associated outer sleeve 32a, 32b via a filling of the outer sleeve 32a, 32b which consists of elastic material 36a, 36b. The elastic material 36a has a first inner elastic element 37a and a second outer elastic element 37b. The two outer sleeves 32a, 32b are connected rigidly to one another by means of a transverse link 38. In one embodiment, the sleeves 32a, 34a, 32a, 32b, 34b consist of steel or of a high-strength light metal alloy, and the elastic material 36a, 36b is a permanently elastic rubber mixture. The inner sleeves 34a, 34b in each case receive a screw or a bolt. In one embodiment, the inner sleeve 34a is connected rigidly to the engine support 24 by means of such a screw, while the inner sleeve 34b is connected rigidly by means of its screw to the auxiliary frame 12c or another part of the body structure. The two ends 28a, 28b of the damping support 28 are thereby coupled elastically to one another. In this case, the damping support is preferably configured such that its spring constant is lower than the spring constant of the torque support 26. It is also preferable that the spring constant of the damping support 28 amounts to 40% to 60% of the spring constant of the torque support 26.

For damping, the damping support 28 has means for the hydraulic damping of transverse vibrations, which in one embodiment are implemented by an hydraulically damped bush. In the illustrated embodiment, the elastic material 36*a* which connects the two sleeves 32*a* and 34*a* of the one end 28*a* of the damping support 28 to one another has cavities 40, 42 and lines 44, 46 connecting the cavities 40, 42 hydraulically. The cavities 40 and 42 are filled with a damping fluid, such as Glysantin™. When transverse vibrations occur, the volumes of the cavities 40 and 42 vary, thus leading to fluid exchange between them. The flow resistance in the lines 44 and 46 damps the transverse vibrations, the amount of damping, which can be characterized by a damping constant, being fixed in structural terms by the length and diameter of the lines 42, 44. In this case, it is preferable that the damping constant of the damping support 28 is higher than a damping constant of the torque support 26.

In the embodiment illustrated, the two ends 28*a*, 28*b* are implemented as elastic bearing elements, one end 28*a* being implemented as an elastically damped bearing element. It will be appreciated, however, that one end of the damping support 28 may also be configured as a rigid bearing element and one end of the damping support may be configured as an elastically damped bearing element. Which side is rigid or elastic and which side is additionally damped is in this case of minor importance for functioning and depends, for example, on the available construction space. It is even possible for both sides to be implemented as elastically damped bearing elements.

The invention claimed is:

1. A device for mounting a drive unit having an engine in a motor vehicle, comprising:
    two elastic motor mounts, each coupling a respective engine support, connected rigidly to the drive unit, elastically to a body structure of the motor vehicle;
    a torque support disposed above said two motor mounts and transversely with respect to a vehicle longitudinal axis, said torque support having a first end coupled to the drive unit and a second end coupled to the body structure;
    a damping support disposed at a lower level than said torque support transversely with respect to the vehicle longitudinal axis, said damping support having a first end coupled to the drive unit and a second end coupled to the body structure;
    said damping support and said torque support are disposed respectively in a horizontal plane at opposite sides of the engine;
    said torque support disposed at an upper end of the engine;
    said damping support disposed at a lower end of the engine and said first end having a hydraulically dampened sleeve connected to the engine support, said hydraulically dampened sleeve having an inner sleeve and an outer sleeve with cavities formed by a space between said inner sleeve and said outer sleeve and filled with a damping fluid;
    said damping support having a screw and a first inner elastic element disposed on and completely surrounding said inner sleeve, said inner sleeve connected with the engine support via said screw;
    said damping support having a second outer elastic element disposed between said outer sleeve and said first inner elastic element, said second outer elastic element completely lining an inner side of said outer sleeve in a circumferential manner, said first inner elastic element and said second outer elastic element defining channels between said first inner elastic element and said second outer elastic element, said channels fluidically connecting said cavities; and
    said cavities being divided such that transverse vibrations of the engine being damped by means of a fluid exchange via said channels between said cavities,
    wherein said damping support is configured with a spring constant that is lower than a spring constant of said torque support.

2. The device according to claim 1, wherein the spring constant of said damping support amounts to between 40% and 60% of the spring constant of the torque support.

3. The device according to claim 1, wherein:
    said second end of said damping support has a further inner sleeve and a further outer sleeve, said second end connected via said further inner sleeve with the body structure;
    said first and second ends of said damping support are elastic within said outer sleeve and said further outer sleeve; and
    said outer sleeve of said first end connected with the engine.

4. A device for mounting a drive unit having an engine in a motor vehicle, comprising:
    two elastic motor mounts, each coupling a respective engine support, connected rigidly to the drive unit, elastically to a body structure of the motor vehicle;
    a torque support disposed above said two motor mounts and transversely with respect to a vehicle longitudinal axis, said torque support having a first end coupled to the drive unit and a second end coupled to the body structure;
    a damping support disposed at a lower level than said torque support transversely with respect to the vehicle longitudinal axis, said damping support having a first end coupled to the drive unit and a second end coupled to the body structure;
    said damping support and said torque support are disposed respectively in a horizontal plane at opposite sides of the engine;
    said torque support disposed at an upper end of the engine;
    said damping support disposed at a lower end of the engine and said first end having a hydraulically dampened sleeve connected to the engine support, said hydraulically dampened sleeve having an inner sleeve and an outer sleeve with cavities formed by a space between said inner sleeve and said outer sleeve and filled with a damping fluid;
    said damping support having a screw and a first inner elastic element disposed on and completely surrounding said inner sleeve, said inner sleeve connected with the engine support via said screw;
    said damping support having a second outer elastic element disposed between said outer sleeve and said first inner elastic element, said second outer elastic element completely lining an inner side of said outer sleeve in a circumferential manner, said first inner elastic element and said second outer elastic element defining channels between said first inner elastic element and said second outer elastic element, said channels fluidically connecting said cavities; and
    said cavities being divided such that transverse vibrations of the engine being damped by means of a fluid exchange via said channels between said cavities, wherein said damping support is configured with a damping constant that is higher than a damping constant of the torque support.

5. The device according to claim 4, wherein:

said second end of said damping support has a further inner sleeve and a further outer sleeve, said second end connected via said further inner sleeve with the body structure;

said first and second ends of said damping support comprise elastic material within said outer sleeve and said further outer sleeve; and said outer sleeve of said first end connected with the engine.

* * * * *